United States Patent
Hassan et al.

(10) Patent No.: US 7,570,655 B2
(45) Date of Patent: Aug. 4, 2009

(54) DISTRIBUTED ROUTER APPLICATION SERIALIZATION

(75) Inventors: Ahmed Hassan, Waterloo (CA); J. F. (Sean) Wilson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1066 days.

(21) Appl. No.: 10/874,277

(22) Filed: Jun. 24, 2004

(65) Prior Publication Data
US 2004/0264436 A1    Dec. 30, 2004

(30) Foreign Application Priority Data
Jun. 24, 2003    (EP)    ................... 03253974

(51) Int. Cl.
*H04L 12/54* (2006.01)
(52) U.S. Cl. ............... 370/428; 370/216; 370/374; 709/242; 714/2
(58) Field of Classification Search ............ 370/216, 370/352, 401, 428, 374; 709/242; 714/2
See application file for complete search history.

(56) References Cited

U.S. PATENT DOCUMENTS

| | | | |
|---|---|---|---|
| 6,332,163 B1* | 12/2001 | Bowman-Amuah | 709/231 |
| 6,618,397 B1* | 9/2003 | Huang | 370/474 |
| 6,745,339 B2* | 6/2004 | Shoaib et al. | 714/1 |
| 7,050,432 B1* | 5/2006 | Banavar et al. | 370/390 |
| 2002/0089990 A1 | 7/2002 | Rombeaut et al. | |
| 2004/0064647 A1* | 4/2004 | DeWhitt et al. | 711/135 |
| 2004/0123242 A1* | 6/2004 | McKibben et al. | 715/513 |

OTHER PUBLICATIONS

European Search Report and non binding opinion for Corresponding European patent application No. EP 03 25 974.

* cited by examiner

*Primary Examiner*—Simon Sing
*Assistant Examiner*—Akelaw A Teshale
(74) *Attorney, Agent, or Firm*—Ridout & Maybee LLP

(57) ABSTRACT

A router, which may be a wireless gateway, for routing messages between communications networks, including a persistent storage, and a transport interface for sending outgoing messages to communications devices associated with a first communications network, and receiving incoming messages from the communications devices, and having a storage for storing pending outgoing and incoming messages for subsequent sending by the interface component, the transport interface being coupled to the persistent storage and having an associated shutdown module for serializing at least some of the pending messages to the persistent storage during shutdown of the interface component. The router may include a plurality of the transport interfaces, and a controller coupled to the transport interfaces for directing at least one of the transport interfaces to retrieve from the persistent storage for subsequent sending the pending messages serialized thereto by a further one of the transport interfaces during shutdown thereof.

16 Claims, 3 Drawing Sheets

DISTRIBUTED ROUTER APPLICATION SERIALIZATION

This application claims foreign priority to European Patent Application No. EP 03253974.4 filed Jun. 24, 2003

FIELD OF THE INVENTION

The present invention relates to network communications and more particularly, to a distributed router for use in network communications.

BACKGROUND OF THE INVENTION

As known in the art, routers are used to direct and reconfigure electronic traffic in and between communications networks, and are often located at the interface between two networks. Distributed routers generally use several similar or identical components that operate in parallel to provide increased capacity and redundancy. Load balancing is typically used to distribute the workload among the distributed router components.

Routers are sometimes used as wireless gateways to wireless networks. By way of example, U.S. Pat. No. 6,219,694, issued Apr. 17, 2001, to Lazaridis et al. and assigned to Research in Motion Limited discloses a system for communicating with mobile devices, in which a wireless gateway is employed.

A common concern with routers is that messages may be lost when a router component malfunctions or shuts down. This is particularly a concern when the router is a gateway to a wireless network in which mobile devices may run out of power, go out of range, or be turned off during a communications session. Lost messages can also be a concern when the router is gateway to a high latency wired network, such as a telephone modem connection, for example. Thus, there is a need for a router configuration and method that minimizes occurrences of lost messages, particularly in the context of high latency communications networks such as wireless networks.

SUMMARY OF THE INVENTION

According to one aspect of the invention, there is provided a router, which may be a wireless gateway, for routing messages between communications networks, including a persistent storage, and a transport interface for sending outgoing messages to communications devices associated with a first communications network, and receiving incoming messages from the communications devices, and having a storage for storing pending outgoing and incoming messages for subsequent sending by the interface component, the transport interface being coupled to the persistent storage and having an associated shutdown module for serializing at least some of the pending messages to the persistent storage during shutdown of the interface component. The router may include a plurality of the transport interfaces, and a controller coupled to the transport interfaces for directing at least one of the transport interfaces to retrieve from the persistent storage for subsequent sending of the pending messages serialized thereto by a further one of the transport interfaces during shutdown thereof. The first communications network may be a wireless network and the router a wireless gateway.

According to another aspect of the invention, there is provided a method for shutting down a router interface component that is configured to send outgoing messages addressed to communications devices associated with a first communications network, and to receive incoming messages from the communications devices, the router interface component having a storage to store pending outgoing and incoming messages for subsequent sending, the shutdown method including a step of writing to a persistent storage at least some of the pending messages stored in the storage of the router interface component.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein.

DETAILED DESCRIPTION

Figure 1:
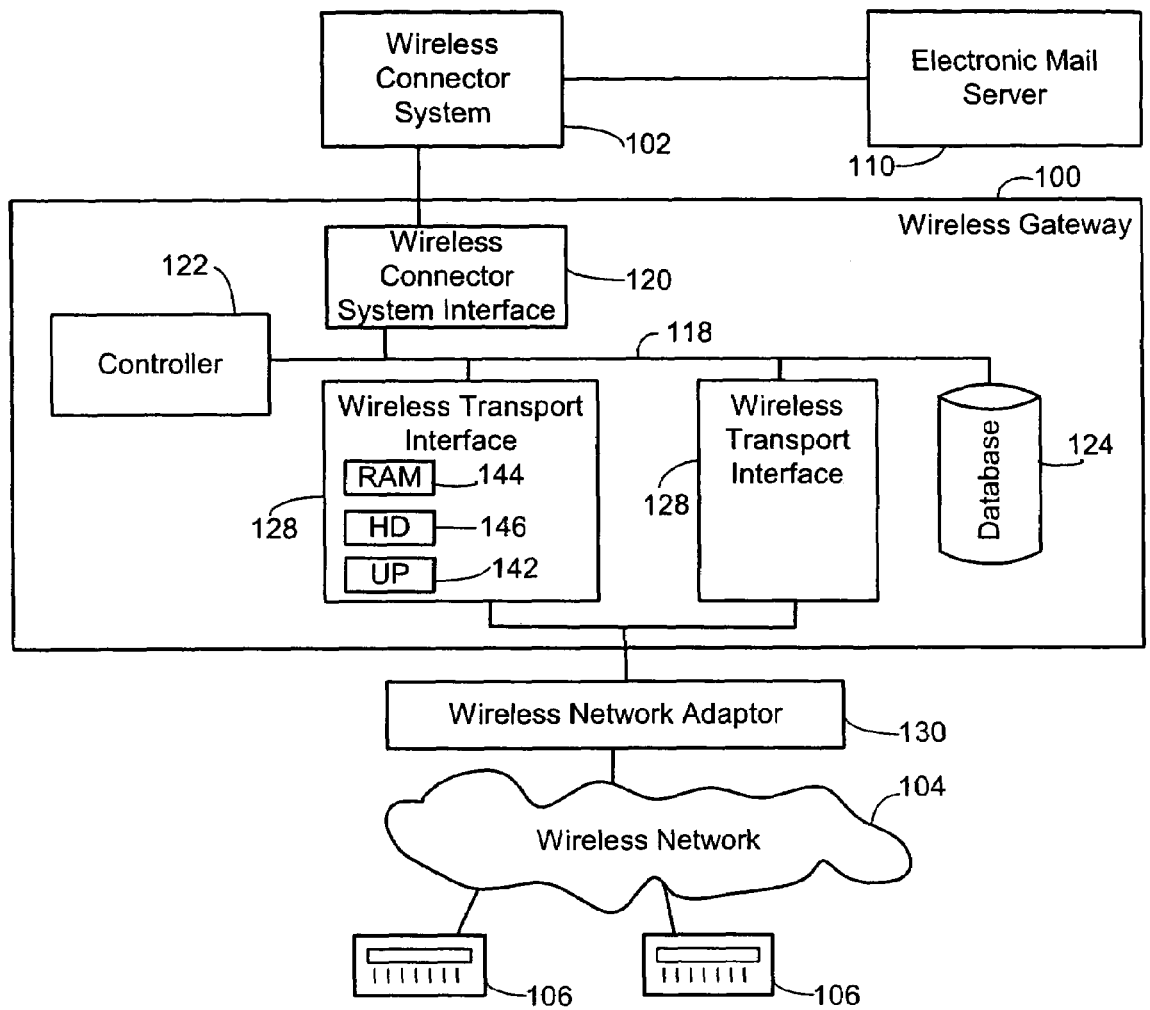
FIG. 1 is a block diagram showing a communications system including a wireless gateway according to embodiments of the present invention.

Referring to the drawings, FIG. 1 is a block diagram of a communications system that includes a router in the form of a wireless gateway 100 according to embodiments of the invention. In the illustrated embodiment, the wireless gateway 100 is adapted to perform translation and routing services between one or more electronic mail servers 110 and one or more wireless networks 104, allowing data packets to be exchanged between mobile devices 106 and the one or more mail servers 110 through a wireless connector system 102.

Wireless connector system 102 is part of a wired network and is connected to send, forward and transmit to wireless gateway 100 data packets from electronic mail server 110 that are destined for mobile devices 106. Similarly, the wireless connector system 102 receives, through the wireless gateway 100, data packets from wireless devices 106 that are destined for electronic mail server 110. Wireless connector system 102 preferably has a unique address from the perspective of the wireless gateway 100.

Electronic mail server 110 is coupled to wireless connector system 102 and may be a conventional electronic mail server, for example it could be a computer running Microsoft™ Exchanger Server or other commercially available mail server software. Wireless connector system 102 and electronic mail server 110 are discussed herein as a possible destination for and source of data packets for illustrative purposes, and it should be understood that the present invention can be applied in other communications systems having different destination and source devices.

The wireless gateway 100 forms a connection or bridge between the wired network that includes electronic mail server 110 and wireless connector system 102, and the wireless network 104. The wireless gateway is configured as a distributed application, and includes several distributed components including, among other things, one or more wireless connector system interfaces 120, one or more controllers 122, a permanent storage database 124, and wireless transport interface modules 128. Each separate component 120, 122, 128, 124 is preferably implemented using a separate dedicated digital computer running a specialized application, with the computers being connected to a common network 118, and thus, as illustrated in one of the wireless transport interfaces 128 of FIG. 1, each component includes, among other things, a microprocessor 144 for executing programmed instructions, and local storage, including transient storage such as RAM 144 and permanent or persistent storage such as a hard drive 146.

Wireless connector system interface 120 is configured to manage the connection between the wireless gateway 100 and at least one wireless connector system 102. Wireless connector system interface 120 receives data packets from the wireless connector system 102 and then forwards the packets to a selected wireless transport interface for subsequent forwarding to a destination mobile device 106. Similarly, wireless connector system interface receives from wireless transport interfaces 128 data packets originating from mobile devices 106 that are destined for electronic mail server 110.

The database 124 of the wireless gateway 100 stores data used by the other components of the wireless gateway for administrative, tracking and message recovery purposes. Among other things, the database stores configuration information for the wireless gateway components, keeps data as to the current status and state of the wireless gateway, stores information about the mobile devices 106 that communicate with the wireless gateway 100, and, as will be explained in greater detail blow, stores information about selected data packets. The information stored by the database 124 assists with disaster/error recovery and can permit a backup component to take over the functions of a component that fails. The database 124 can be implemented by any commercially available database server with the appropriate speed and storage capacity.

The wireless gateway 100 includes at least one controller for controlling and coordinating operation of the gateway. Among other things, the controller 122 monitors the operation of the components and to detect the failure or pending failure of components within the wireless gateway and coordinate other components to take over the functions of failed components.

The wireless transport interfaces 128 are the wireless gateway's interface to the mobile devices 106, and assemble messages that are destined for mobile devices into sequences of packets, the format of which is dependent on the specific wireless network. Similarly, the wireless transport interfaces 128 recombine and assemble data packets destined for the electronic mail server 110 from sequences of packets sent from the mobile devices 106. The wireless transport interfaces 128 may communicate with the wireless networks through one or more wireless network adaptor(s) 130 that provide an intermediary routing mechanism. In one embodiment, network interface adaptor 130 has a TCP/IP connection to wireless transport interfaces 128 and an X.25 or UDP protocol connection to wireless network 104 such that the network interface adaptor 130 routes data packets from the wireless transport interfaces over a TCP/IP connection to an X.25 mobile network connection and vice versa. The controller 122 is responsible for assigning, based on conventional load balancing considerations, a specific wireless transport interface 128 to be responsible for communications with a specific mobile device 106 at a given time period.

Mobile networks 104 provide radio coverage to mobile devices 106, and may be a number of different types of network, including for example, Mobitex Radio Network, DataTAC, or a GPRS, CDMA, or iDEN network. Mobile devices 106 may be handheld or other mobile digital computing devices that are configured to send and receive electronic messages, for example two-way paging devices, portable electronic messaging devices, email or messaging enabled cell phones, or handheld e-mail clients.

The present invention particularly relates to the operation of wireless gateway 100 during shutdown or failure of one of the applications that implement the various components of gateway 100, and more particularly to treatment of data packets passing through the wireless gateway 100 to minimize lost messages when a gateway application fails. A message or data packet will generally be considered to be lost when the device from which the message or data packet originated has incorrect information about the status of the message.

In one illustrative embodiment of the invention, mobile device 106 is configured to assume that data packets originating from it have been delivered to the intended destination unless an error code status message is sent back to the mobile device 106 from wireless transport interface 128. In such a configuration, a data packet will be lost in the event that both of the following conditions are met: (a) a failure occurs in delivering the data packet to its destination and (b) the failure is not reported, by way of status message, to the mobile device 106. The failure can be due to any number of reasons including, among other things, an incorrect destination address; a lack of authorization leading to a refusal of the data packet at wireless gateway 100, wireless connector system 102 or electronic mail server 110; or an application or component failure in the communications chain. Thus, in such a configuration, it is critical that status messages be transmitted to mobile device 106 in order to avoid lost data packets originating therefrom. In wireless gateway 100, responsibility for pushing status messages back to mobile device 106 falls on the wireless transport interface 128 that has been assigned to or associated with the mobile device 106.

Lost data packets are particularly of concern when there is a high latency link to the originating device, such as in the case of mobile device 106 which communicates through wireless network 104. The communications link between wireless gateway 100 and the mobile device 106 will in many cases be relatively unreliable as it can be interrupted in a variety of ways—for example, mobile device 106 may lose power, either through intentional power down or due to a drained battery; mobile device 106 could go out of range of or lose connection with wireless network 104; and wireless network 104 may drop the connection with mobile device 106 as a result of insufficient network resources. In such situations, the wireless transport interface 128 is configured to store any pending error code messages destined for the mobile device 106 and keep for a predetermined time period so that they can be sent if the mobile device comes back on-line prior to the expiry of the predetermined time period.

A potential problem can arise, however, when a wireless transport interface 128 fails—either through a crash of a specialized software application running on the processor 142 of the wireless transport interface 128, or through some other failure at wireless transport interface 128, and the wireless transport interface contains pending status messages that are waiting to be delivered to mobile device 106, or is in the process of receiving a series of data packets from a mobile device 106.

In one embodiment, wireless gateway 100 is configured to monitor for an impending failure of wireless transport interfaces 128 and undertake an application shutdown process in the event that an impending failure is predicted. Such monitoring can be performed by monitoring applications running on the wireless transport interfaces 128 and/or the controller 122, and can include monitoring of various operating characteristics of each component, including for example, the CPU usage and or memory usage by applications running on the wireless transport interfaces 128. By comparing the monitored operating characteristics against predetermined performance criteria a determination can be made if a specific component or application is facing an impending failure or crash. In one exemplary embodiment, memory usage by the one or more software applications of the wireless transport interface 128 is monitored, and the shutdown process started if such memory usage exceeds predetermined thresholds.

According to embodiments of the present invention, a shutdown and recovery procedure, indicated generally by reference 200 in FIG. 2, will now be described with further reference to the block diagram of FIG. 3, which diagrammatically represents a pending data packet buffer or queue 300 maintained by an application used to implement a wireless transport interface 128. The pending data packet queue 300 could be stored in transient or persistent local storage of the wireless transport interface 128 or a combination thereof. As graphically illustrated in FIG. 3 at any given moment, each wireless transport interface 128 will have a queue 302 of pending incoming data packets from mobile devices 106 that are waiting to be sent on to wireless connector system 102, and a queue 304 of pending outgoing data packets destined for mobile devices 106. Incoming from mobile device queue 302 can include, among other things, email messages 306 and status messages 310 (status messages may, for example, include error code acknowledgements (EC), or in some embodiments, delivery acknowledgements). Some of the email messages 306 may be incomplete as not all packets associated with a particular message have been received from the originating mobile device 106. The outgoing to mobile queue 304 can include, among other things, email messages 312, and status messages 314 such as error code messages, and in some embodiments, acknowledgement messages. These status messages can be further categorized as "new" error code messages, meaning those which have not yet been transmitted over the wireless network 104, and "old" error code messages, meaning those that have been previously, but unsuccessfully, sent out to a mobile device. "Old" error code messages can also include stored status messages retrieved by the wireless transport interface 128 from the database 124. Such stored status messages may be messages that were generated by a previous instance of a wireless transport interface and stored at the database 124 upon shutdown of the previous instance of the wireless transport interface. The messages in queue 300 will typically be accompanied by status and routing information, including for example, source and destination device addresses, and time stamp and type of message information. The data packet queue 300 as shown in FIG. 3 is illustrative only, and in practice the queue may take a number of different configurations and be broken into a number of different sub-queues or buffers.

Figure 2:
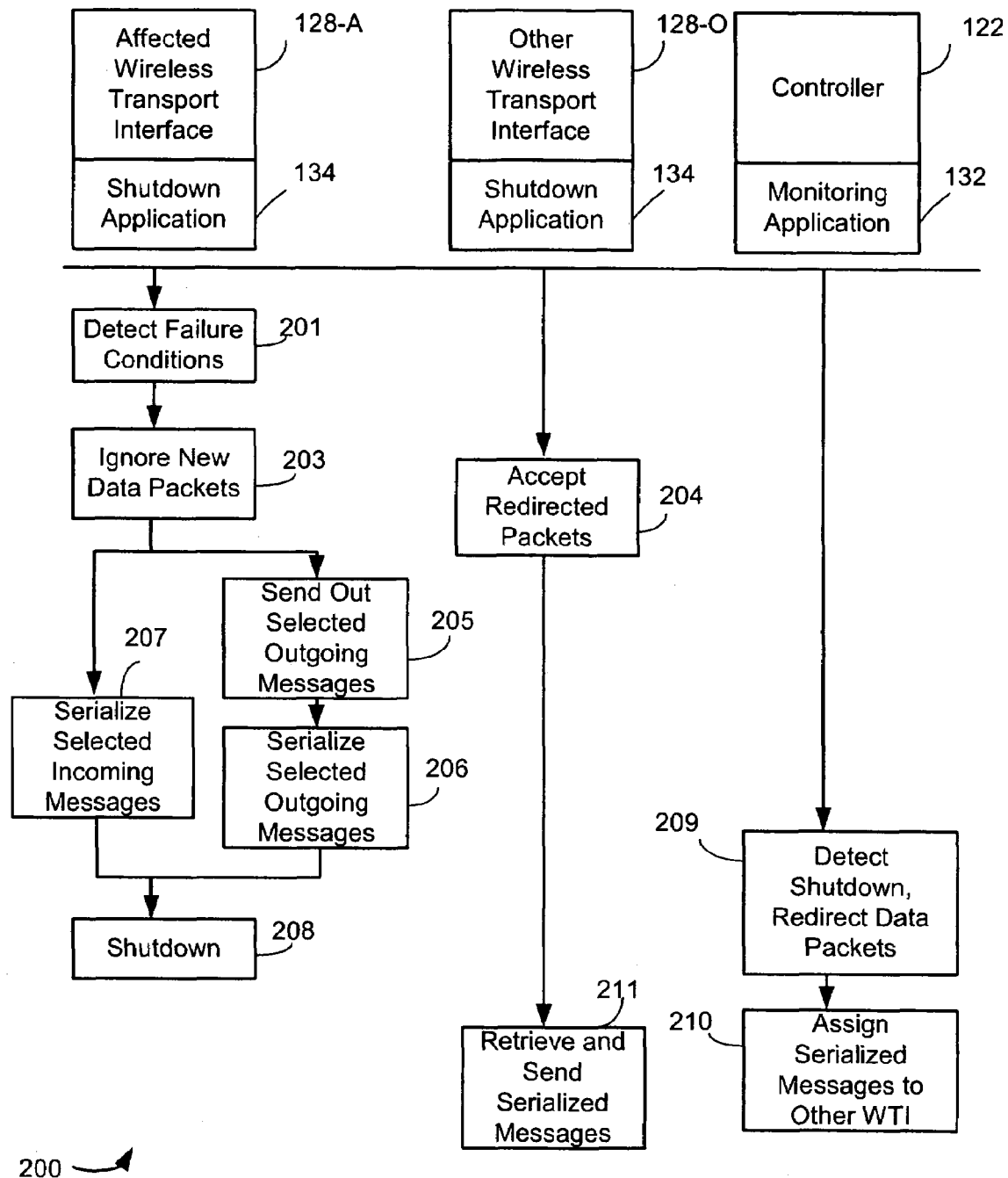
FIG. 2 is a flow diagram of a shut down process for a wireless transport interface of the wireless gateway of FIG. 1 according to embodiments of the present invention.
Figure 3:
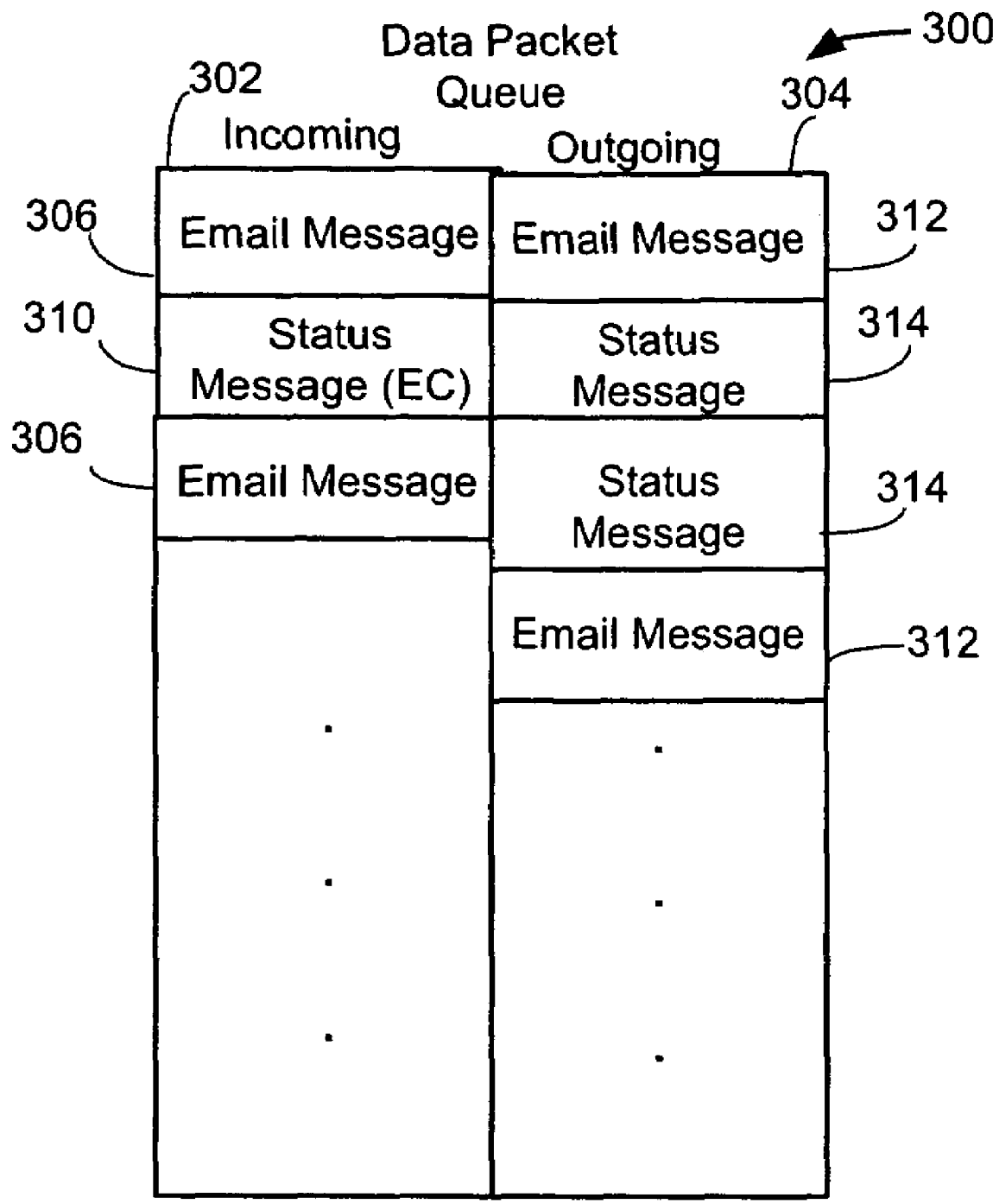
FIG. 3 is a block diagram representation of a pending message queue of a wireless transport interface of the wireless gateway.

The flow chart of FIG. 2 diagrammatically illustrates the actions taken at each of the controller 122, an affected wireless transport interface (indicated by reference numeral 128-A) and the other wireless transport interface(s) (indicated by reference numeral 128-O) of the wireless gateway 100, during shutdown and recovery procedure 200 according to embodiments of the invention. In various embodiments of the invention the controller 122 and wireless transport interfaces 128 include associated monitoring and shutdown modules or applications 132, 134, respectively that include the processing instructions configuring them to carry out process 200. As indicated at step 201, the process commences with detection of an impending failure at the affected wireless transport interface 128-A. In one example embodiment, shutdown detection is performed by shutdown application 134 of the affected wireless transport interface 128-A, however, in other embodiments, such detection could be made by monitoring applications resident on either or both of wireless transport interface 128-A or controller 122. The process 200 may, in some embodiments, be commenced by way of intentional operator activated shutdown in order to intentionally take wireless transport 128-A off-line for maintenance or replacement purposes.

As indicated in step 203, upon commencement of shutdown process 200, the affected wireless transport interface 128-A stops accepting any new data packets from either the wireless connector system 102 or from any mobile devices 106. Upon detecting that the affected wireless transport interface 128-A is not accepting any packets, the wireless network interface adaptor 130 is configured to redirect incoming data packets from mobile devices 106 to one or more other wireless transport interfaces 128-O, or, if an alternative wireless transport interface cannot be found, then send an error code back to the sending mobile device 106. As indicated at step 204, the other wireless transport interface 128-O starts handling the redirected data packets and integrates them into the traffic that was already being carried by it.

The affected wireless transport interface 128-A then takes steps to process the pending messages in its incoming from mobile queue 302 and outgoing to mobile queue 304. Turning firstly to the outgoing to mobile queue 304, in a preferred embodiment, the wireless transport interface 128-A continues to send out selected pending message data packets to mobile devices for an initial shutdown duration (step 205). The initial shutdown duration in an example embodiment lasts until a predetermined time duration (for example 30 seconds) has passed. In various embodiments, the time duration can be configurable and other or additional criteria is used to determine the end of the initial shutdown duration can last, such as, for example, if monitored operating characteristics of the wireless transport interface 128-A (for example memory usage) meet predetermined criteria that are indicative of a need to end the initial shutdown duration.

The wireless transport interface 128-A is configured to maintain a reasonable transmission to mobile device rate during the initial shutdown duration, so as to not flood the wireless network—preferably, the wireless transport interface 128-A does not substantially go over its normal operating transmission to mobile rate. During the initial shutdown duration (step 205), the wireless transport interface 128-A is configured to prioritize the contents of the outgoing to mobile queue 304, with status messages 314, for mobile devices 106 that are tracked as currently being active within the coverage of wireless network 104 being prioritized over status messages for known out-of-coverage devices. Status messages that are required to avoid lost data packets are further prioritized. Normal email messages 312 in the outgoing to mobile queue 304 will generally be ignored in one embodiment, as the wireless connector system interface 120 will be configured to resend such messages through other wireless transport interfaces 128-O if an acknowledgment is not received from the affected wireless transport interface 128-A within a predetermined time.

As indicated at step 206, at the end of the initial shutdown duration, the affected wireless transport interface 128-A enters a second shutdown duration during which it stops sending data from the outgoing to mobile queue 304 to mobile devices, and starts serializing any remaining critical status messages in the outgoing to mobile queue 304 that were not sent out during step 205. Critical status messages include those messages that need to be saved to avoid lost messages More particularly, the affected wireless transport interface 128-A starts serializing the critical status messages to the database 124, along with time stamp information that indicates the time of wireless transport interface 128-A shutdown. In one embodiment, if the wireless transport interface 128-A is unable to communicate with the database 124, it will serialize the critical status messages to a predetermined file in its own persistent memory (for example its hard drive), so that the information can be retrieved in the future. The second shutdown duration preferably lasts until all the critical status messages have been serialized (after which the affected wireless transport interface 128-A can be shut-down, as indicated by step 208), unless the wireless transport interface 128-A crashes first to such an extent that it can't complete the process.

Turning now to the incoming from mobile queue 302, during the shutdown duration, the affected wireless transport interface 128-A serializes to the database 124 the state of all incoming from mobile email messages 306 and status messages, including but not limited to receive message acknowledgements 308, and error code acknowledgements 310 (step 207). More particularly, the wireless transport interface 128-A writes all incoming status messages that are in the mobile queue 302 to a selected file in the database 124. The saved status messages are time stamped with the shutdown time. For email messages 306 that are in the queue 302 that have not yet been written to the database 124, including incomplete messages for which the wireless transport interface 128-A was still waiting for at least one more packet, the wireless transport interface 128-A writes an error message to the database file. The error message, which is date stamped with the shutdown time, includes sufficient information allow an error code message to subsequently be sent back to the originating mobile device 106. If the database 124 is unavailable during the shutdown, the wireless transport interface 128-A will write the information about queue 302 to its own persistent memory, for example a local hard drive, under a predetermined file name, so it can be retrieved at a latter time.

In one example embodiment, the monitoring application 132 of controller 122 periodically poles wireless transport interfaces to determine if they are still operating. Upon shutdown (step 208) of the affected wireless transport interface 128-A, the controller detects that the wireless transport 128-A is no longer operating, and as indicated at step 209, the controller 122 instructs the wireless connector system interface 120 to redirect any new incoming data packets from wireless connector system 102 that would otherwise have gone to the affected wireless transport interface 128-A to instead go to one or more other wireless transport interfaces 128-O.

At the completion of shutdown of the affected wireless transport interface 128-A, the serialized state information that has been stored at the database 124 can be retrieved and used by other wireless transport interfaces 128-O (step 211), as assigned by controller 122 (step 210), to replicate the shut-down wireless transport interface 128-A. For example, a selected replacement wireless transport interface (WTI) 128-O, or a number of selected replacement wireless transport interfaces, can be instructed to retrieve from the database 124 all of the critical status messages 314 that were saved during step 206, and to send the critical status messages 314 out to the addressed mobile devices 106. Preferably, the retrieved data is worked in over time into the regular traffic stream transmitted by the replacement wireless transport interfaces 128-O, in order to avoid flooding the network or disrupting the regular traffic stream. The replacement wireless transport interface 128-O also retrieves from the database 124 the error code messages that were generated during the shutdown procedure in respect of undelivered incoming from mobile device messages 306, and send such error code messages to the originating mobile devices. The replacement wireless transport interface 128-O also retrieves any serialized incoming status messages 310 and sends them to the appropriate destination. In one embodiment, the serialized data is deleted from the database 124 and the replacement wireless transport interface 128-O when confirmation is received that it has been delivered, or, if successful delivery does not occur, after a predetermined time interval (for example several weeks).

It will be appreciated that the shutdown and replication procedure herein described will reduce the number of lost messages as critical status messages that cannot be sent out during shutdown are stored so that they can subsequently picked up and sent out by a replacement component. The embodiment described above in respect are in respect of a mobile device assumes a sent message has been successfully received unless the mobile device receives an error code. However, in some networks, the mobile device may need to receive an acknowledgement even for successfully sent messages, and in such networks, any unsent acknowledgements in outgoing to mobile queue 304 are also serialized during the shutdown procedure as critical status messages and then subsequently retrieved and sent by a replacement wireless transport interface 128-O.

It will be appreciated that the process described above in respect of a wireless transport interface 128 relates to a wireless network, the process could also be performed for devices routing messages to wired networks, and in particular to high latency wired networks such as LAN networks with slow connections such as dial up connections, or for other applications were routing between high speed and low speed networks is required.

The above-described embodiments of the present invention are intended to be examples only. Alterations, modifications and variations may be effected to the particular embodiments by those skilled in the art without departing from the scope of the invention, which is defined by the claims appended hereto.

We claim:

1. A router for routing messages between communications networks, including:

a persistent storage; and an transport interface for sending outgoing messages to communications devices associated with a first communications network, and receiving incoming messages from the communications devices, and having a storage for storing pending outgoing and incoming messages for subsequent sending by the transport interface, the transport interface being coupled to the persistent storage and having an associated shutdown module for serializing at least some of the pending messages to the persistent storage during shutdown of the transport interface, the transport interface being configured to, during shutdown, select pending messages for storage to the persistent storage based on predetermined criteria.

2. The router of claim 1 including a plurality of the transport interfaces operating simultaneously, and a controller coupled to the transport interfaces for directing at least one of the transport interfaces to retrieve from the persistent storage for subsequent sending the pending messages serialized thereto by a further one of the transport interfaces during shutdown thereof.

3. The router of claim 2 wherein the controller monitors for shutdown of the transport interfaces, and the router includes a system interface coupled to the transport interfaces for receiving from a second communications network the outgoing messages for routing through the transport interfaces to the communications devices, the controller being coupled to the system interface for directing the system interface to route the outgoing messages to the communications devices through transport interfaces other than the further transport interface upon detecting a shutdown thereof.

4. The router of claim 3 wherein each of the transport interfaces, controller, persistent storage and network interface are implemented on separate digital computers that are connected by a common network.

5. The router of claim 1 wherein the persistent storage and the transport interface are each implemented on separate digital computers that are connected by a network, and the transport interface is configured to determine, during shutdown routine, if at least some pending messages can be stored at the persistent shutdown storage, and if not, to store the at least some pending messages at a persistent storage local to the at least one transport interface.

6. The router of claim 1 wherein the transport interface sends out at least some of the pending outgoing messages to the communications devices during an initial duration of the shutdown of the transport interface, and then writes at least some of the remaining pending outgoing messages to the persistent storage during a second duration of the shutdown.

7. The router of claim 1 wherein the pending messages are selected based on a determination of which of the pending messages are required to be sent to the communications devices by the router to avoid an incorrect determination by one of the communications devices associated with the first communications network of the status of a message originating therefrom.

8. The router of claim 1 wherein the first communications network is a wireless network, the router being a wireless gateway to the wireless network, at least some of the communications devices associated with the first communications network being mobile devices.

9. A method for storing messages during shutting down of a router interface component that is configured to send outgoing messages addressed to communications devices associated with a first communications network, and to receive incoming messages from the communications devices, the router interface component having a storage to store pending outgoing and incoming messages for subsequent sending, the method including, during shutdown, selecting, based on predetermined criteria, messages from among the stored pending outgoing and incoming messages and storing the selected messages to a persistent storage.

10. The method of claim 9 wherein the router interface component is connected to a common network with a database at which the persistent storage is located.

11. The method of claim 10 including a step of determining if the persistent storage at the database is available for writing at least some pending messages to, and if not, then writing the at least some pending messages to a persistent storage local to the interface component.

12. The method of claim 9 wherein the router interface component is connected to a common network with at least one further router interface component, the method including a further step of the at least one further router interface component retrieving the stored pending messages for subsequent sending.

13. The method of claim 9 including steps of monitoring operating conditions of the router interface component and directing outgoing messages away from the router interface component to another router interface component if the monitored operating conditions indicate a shutdown the router interface component.

14. The method of claim 9 including, prior to writing at least some pending messages to the persistent storage, attempting to send at least some of the pending outgoing messages to the communications devices for a predetermined duration.

15. The method of claim 9 wherein the predetermined criteria are biased to select pending messages required to be sent by the router interface component to avoid an incorrect determination by one of the communications devices associated with the first communications network of the status of a message originating therefrom.

16. The method of claim 9 wherein the first communications network is a wireless network, at least some of the communications devices associated with the first communications network being mobile devices.

* * * * *

UNITED STATES PATENT AND TRADEMARK OFFICE
CERTIFICATE OF CORRECTION

PATENT NO. : 7,570,655 B2 Page 1 of 1
APPLICATION NO. : 10/874277
DATED : August 4, 2009
INVENTOR(S) : Hassan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1441 days.

Signed and Sealed this

Seventh Day of September, 2010

David J. Kappos
*Director of the United States Patent and Trademark Office*